(12) United States Patent
Yasuda

(10) Patent No.: US 8,599,272 B2
(45) Date of Patent: Dec. 3, 2013

(54) IMAGING APPARATUS WITH ROLL ANGLE CORRECTION AND METHOD OF ANGLE CORRECTION OF OBJECT

(75) Inventor: Takuroh Yasuda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 233 days.

(21) Appl. No.: 12/824,333

(22) Filed: Jun. 28, 2010

(65) Prior Publication Data

US 2011/0007169 A1    Jan. 13, 2011

(30) Foreign Application Priority Data

Jul. 8, 2009 (JP) ................. 2009-161603

(51) Int. Cl.
*H04N 5/228* (2006.01)
*G01C 9/00* (2006.01)
*G05B 19/18* (2006.01)

(52) U.S. Cl.
USPC .................. 348/208.2; 702/151; 700/62

(58) Field of Classification Search
USPC ......... 348/208.2; 702/94, 141, 150, 151, 152, 702/153, 154, 191; 700/62; 701/505, 508; 33/356
See application file for complete search history.

(56) References Cited

U.S. PATENT DOCUMENTS

| | | | |
|---|---|---|---|
| 6,164,117 A | 12/2000 | Passwater et al. | |
| 6,636,826 B1 * | 10/2003 | Abe et al. | 702/151 |
| 7,337,549 B2 * | 3/2008 | Cho et al. | 33/356 |
| 7,389,590 B2 * | 6/2008 | Lee et al. | 33/356 |
| 7,395,987 B2 * | 7/2008 | Lindquist et al. | 244/3.21 |
| 7,554,578 B2 * | 6/2009 | Molgaard | 348/231.3 |
| 7,809,505 B2 * | 10/2010 | Lee et al. | 701/508 |
| 2004/0007064 A1 | 1/2004 | Sakaguchi | |
| 2005/0256675 A1 * | 11/2005 | Kurata | 702/153 |
| 2006/0265178 A1 * | 11/2006 | Townsend et al. | 702/153 |
| 2007/0239401 A1 * | 10/2007 | Cho et al. | 702/189 |
| 2008/0084479 A1 * | 4/2008 | Uenaka | 348/208.5 |
| 2008/0319708 A1 * | 12/2008 | Cho | 702/154 |
| 2009/0096910 A1 | 4/2009 | Yasuda et al. | |
| 2009/0316532 A1 * | 12/2009 | Hasegawa | 368/1 |
| 2010/0165130 A1 * | 7/2010 | Uenaka | 348/208.7 |

FOREIGN PATENT DOCUMENTS

| | | |
|---|---|---|
| JP | 2008-116920 A | 5/2008 |
| JP | 2009-94987 A | 4/2009 |

* cited by examiner

*Primary Examiner* — John Villecco
(74) *Attorney, Agent, or Firm* — Dickstein Shapiro LLP

(57) ABSTRACT

An information device includes: an angle detector which outputs data for obtaining a roll angle and a pitch angle of an object; and a corrector which corrects the roll angle based on the pitch angle obtained from the data outputted by the angle detector.

10 Claims, 4 Drawing Sheets

IMAGING APPARATUS WITH ROLL ANGLE CORRECTION AND METHOD OF ANGLE CORRECTION OF OBJECT

CROSS-REFERENCE TO RELATED APPLICATION

The present application is based on claims from Japanese patent application number 2009-161603, filed Jul. 8, 2009, the disclosure of which is hereby incorporated by reference herein its entirety.

BACKGROUND

The present invention relates to an information device which is capable of correcting a roll angle based on a pitch angle of an object, an imaging apparatus which has the information device and is capable of displaying the pitch angle and the corrected roll angle, and a method of an angle correction of the object.

Traditionally, in an imaging apparatus such as a camera, for example, as disclosed in Japanese patent application publication number 2009-094987, the invention is known such that a pitch angle and a roll angle of the camera are calculated based on an output from an acceleration sensor, and the pitch angle and the roll angle are displayed on a display section of the camera in the case of imaging.

In Japanese patent application publication number 2009-094987, it is disclosed that as a pitch angle increases, an accuracy of a roll angle degrades, and in order to inform a user of this problem, it is disclosed that when the pitch angle becomes a certain degree, a display blinks and an alarm sound goes off.

Thus, there is a problem such that due to increasing the pitch angle (increasing a sensitivity of a Z axis), the sensitivity of X and Y axes, which are necessary to calculate the roll angle, degrades, which causes an error in the case of calculating the roll angle.

Generally, as for an acceleration sensor, there is a cross-axis sensitivity, and detected acceleration in a Z axis direction affects outputs in directions of other axes (X and Y axes), for example. This occurs because sensing elements which detect acceleration in each axis direction are put into a single package. Therefore, as a pitch angle changes, a detection output of a roll angle is also affected.

SUMMARY

An objective of the present invention is to provide an information device which is capable of correcting a roll angle when a pitch angle changes, and an imaging apparatus which has the information device and is capable of displaying the pitch angle and the corrected roll angle, and a method of an angle correction of an object.

In order to achieve the above objective, an embodiment of the present invention provides: an information device, comprising: an angle detector which outputs data for obtaining a roll angle and a pitch angle of an object; and a corrector which corrects the roll angle based on the pitch angle obtained from the data outputted by the angle detector.

In order to achieve the above objective, an embodiment of the present invention provides: a digital camera, which is an object, comprising: an information device, including: an angle detector which outputs data for obtaining a roll angle and a pitch angle of the object; and a corrector which corrects the roll angle based on the pitch angle obtained from the data outputted by the angle detector.

In order to achieve the above objective, an embodiment of the present invention provides: a method of an angle correction of an object, comprising: a step of an angle detection which outputs data for obtaining a roll angle and a pitch angle of the object; and a step of a correction which corrects the roll angle based on the pitch angle obtained from the data outputted in the step of the angle detection.

DETAILED DESCRIPTION OF THE PREFERRED EMBODIMENT

Figure 1:
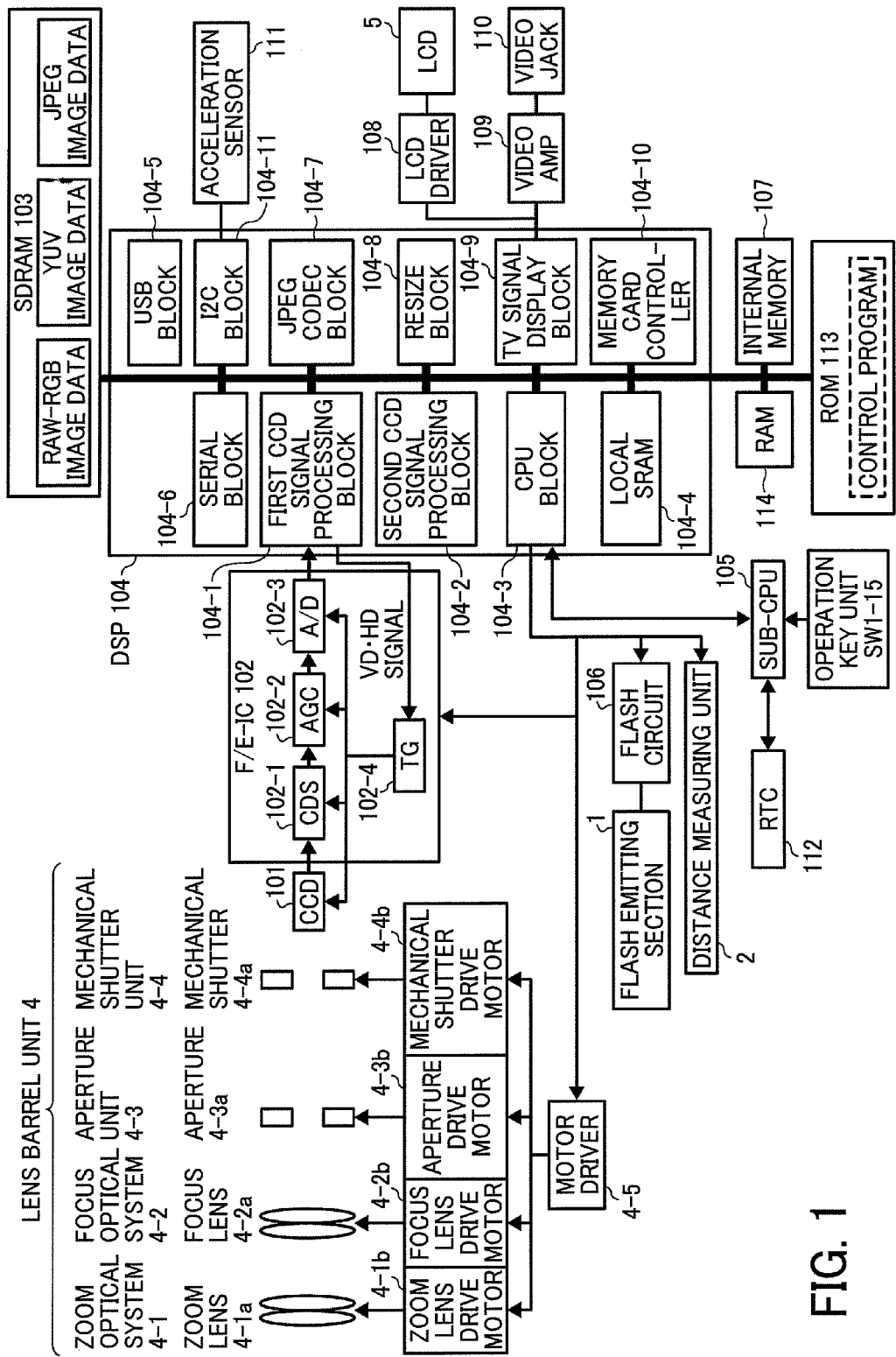
FIG. 1 is a block diagram of a digital camera as an embodiment of an imaging apparatus of the present invention.

Hereinafter, referring to drawings, an embodiment of the present invention will be explained. Each reference numeral denotes members and processes of the present invention, and the same reference numerals are used for the same members and processes.

FIGS. 1, 2A, 2B, 2C are a block diagram and external views of a digital camera as the embodiment using an information device of the present invention.

Firstly, the information device of the present invention will be explained.

[Information Device]

The information device of the embodiment includes a digital signal processor (DSP) 104 (corrector), and an acceleration sensor 111 (angle detector). The information device may have a RAM (random access memory) 114, an internal memory 107, a ROM (read-only memory) 113, and an SDRAM (synchronous dynamic random access memory) 103 other than those above.

A more detailed configuration and operation will be explained later.

[Imaging Apparatus Equipped with Information Device]

An imaging apparatus of the embodiment is equipped with the above information device.

As the imaging apparatus equipped with the information device, the digital camera of FIG. 2 will be explained by way of example.

As illustrated in FIG. 1, a CCD (charge-coupled device) 101 is a solid-state image sensor which photoelectrically converts an optical image incident from a lens and the like. An F/E-IC (front/end-IC) 102 includes a CDS (correlated double sampler) 102-1, an AGC (automatic gain controller) 102-2, an A/D (analog/digital converter) 102-3, a TG (timing generator) 102-4. The CDS 102-1 performs a correlated double sampling for an image denoising. The AGC 102-2 performs a gain adjustment. The A/D 102-3 converts an analog signal to a digital signal. The TG 102-4 generates a drive timing signal of the F/E-IC 102. A vertical synchronizing signal (VD signal) and a horizontal synchronizing signal (HD signal) are supplied by a first CCD signal processing block 104-1 in the information device and the CCD 101 is controlled by a CPU (central processing unit) block 104-3.

A lens barrel unit 4 includes a zoom optical system 4-1, a focus optical system 4-2, an aperture unit 4-3, a mechanical shutter unit 4-4, and a motor driver 4-5. The zoom optical system 4-1 includes a zoom lens 4-1a where an optical image of a photographic subject passes, and a zoom lens drive motor 4-1b. The focus optical system 4-2 includes a focus lens 4-2a, and a focus lens drive motor 4-2b. The aperture unit 4-3 includes an aperture 4-3a, and an aperture drive motor 4-3b. The mechanical shutter unit 4-4 includes a mechanical shutter 4-4a, and a mechanical shutter drive motor 4-4b. The motor driver 4-5 drives each motor.

In the ROM 113, a control program written in a code readable in the CPU block 104-3 and a control parameter are stored. When the digital camera as the imaging apparatus of the embodiment is turned on, the control program is loaded to a main memory, which is not illustrated, in the information device. The CPU block 104-3 controls the operation of each part of a main body of the imaging apparatus based on the control program, and data and the like which are necessary for control are temporarily stored in a RAM (random access memory) 114 and a local SRAM (static random access memory) 104-4 in the DSP 104. By using a rewritable flash ROM as the ROM 113, it is possible to change the control program and the control parameter, and easily upgrade a function.

The DSP 104 includes the first CCD signal processing block 104-1, a second CCD signal processing block 104-2, the CPU block 104-3, the local SRAM 104-4, a USB block 104-5, a serial block 104-6, a JPEG CODEC block 104-7, a RESIZE block 104-8, a TV signal display block 104-9, and a memory card controller block 104-10. The first CCD signal processing block 104-1 receives output data of the F/E-IC 102 and performs a white balance setting and a gamma setting by use of the output data, and as described above, supplies the VD signal and the HD signal. The second CCD signal processing block 104-2 converts the output data to brightness data and color difference data by a filtering operation. The CPU block 104-3 controls the above-described operations of each part of the apparatus. The local SRAM 104-4 temporarily stores the above-described data and the like which are necessary for control. The USB block 104-5 performs a USB communication with an external device such as a personal computer (PC). The serial block 104-6 performs a serial communication with an external device such as a PC. The JPEG CODEC block 104-7 performs JPEG compression and extension of image data. The RESIZE block 104-8 expands and reduces a size of image data by an interpolation operation. The TV signal display block 104-9 converts image data to a video signal for displaying on an external display device such as a liquid crystal display, a TV (television) and so on. The memory card controller block 104-10 performs a control of a memory card which records shot image data. Each of these blocks is mutually connected via bus lines.

The SDRAM 103 temporarily stores image data, when various processes are performed on image data in the DSP 104. The stored image data, for example, are "RAW-RGB image data", "YUV image data", "JPEG image data" and so on. The RAW-RGB image data is image data which is in a state where the white balance setting and the gamma setting have been performed in the first CCD signal processing block 104-1 after being loaded from the CCD 101 via the F/E-IC 102. The YUV image data is image data which is in a state where a conversion to brightness data and color difference data has been performed in the second CCD signal processing block 104-2. The JPEG image data is image data which is in a state where the JPEG compression has been performed in the JPEG CODEC block 104-7. The internal memory 107 is a memory which is capable of recording shot image data. This internal memory 107 can record the JPEG image data.

An LCD driver 108 is a drive circuit which drives an LCD (liquid crystal display) 5. And additionally, the LCD driver 108 also has a function of converting the video signal outputted from the TV signal display block 104-9 to a signal for displaying on the LCD 5. The LCD 5 is a display for monitoring a state of a photographic subject before shooting, checking a shot image, displaying image data recorded in the memory card or the internal memory 107, and so on. A video AMP (amplifier) 109 is an amplifier which converts an impedance of the video signal outputted from the TV signal display block 104-9 to 75Ω. A video jack 110 is a jack which connects to an external display device such as a TV. An operation key unit SW1 to SW15 is a key circuit which a user operates. A SUB-CPU 105 outputs an output signal of the operation key unit SW1 to SW15 and the like as user's operation information to the CPU block 104-3. The SUB-CPU 105 communicates with an RTC (real time clock) 112, which keeps track of the current time, and controls time.

The acceleration sensor 111 is mounted on a printed circuit board (PCB). The acceleration sensor 111 outputs acceleration data in directions of 2 axes (X and Y axes) in the case of a 2-axis acceleration sensor, and outputs acceleration data in directions of 3 axes (X, Y and Z axes) in the case of a 3-axis acceleration sensor. The output data of the acceleration sensor 111 is inputted in an I2C (inter integrated circuit) block 104-11 of the DSP 104 by a serial communication, and a roll angle and a pitch angle of the imaging apparatus are calculated based on the data. The calculated roll angle and pitch angle are displayed on the LCD 5 or the like. A roll angle $\theta_A$ and a pitch angle $\phi$ obtained from the acceleration sensor are expressed by the following Formula 1.

$$\theta_A[deg] = (180/\pi) \times \arctan((Y-Y0)/(X-X0))$$

$$\phi[deg] = (180/\pi) \times \arctan((Z-Z0)/(X-X0)) \quad \text{[Formula 1]}$$

Here, each of X0, Y0, and Z0 is an output of the acceleration sensor in zero gravity. Formula 1 is a calculation formula of the roll angle and the pitch angle in the case of the 3-axis acceleration sensor, however also in the case of the 2-axis acceleration sensor, the roll angle and the pitch angle can be obtained by use of the same formula as the above. (However, a method for detecting if a value of the pitch angle is positive or negative is needed.)

A method of an angle correction of the embodiment includes a step of an angle detection which outputs data for obtaining a roll angle and a pitch angle of an object, and a step of a correction which corrects the roll angle based on the pitch angle obtained from the data outputted in the step of the angle detection. In following examples, the step of the correction will be explained in detail.

EXAMPLES

Figure 2A:
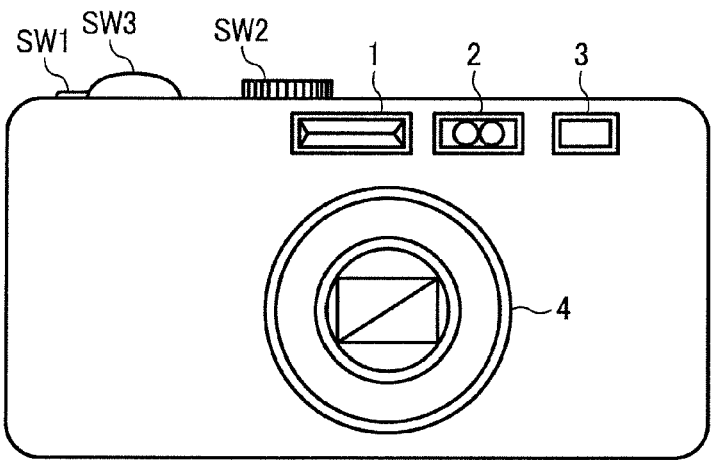
FIG. 2A is a front view of an external view of the digital camera as the embodiment of the imaging apparatus of the present invention.
Figure 2B:
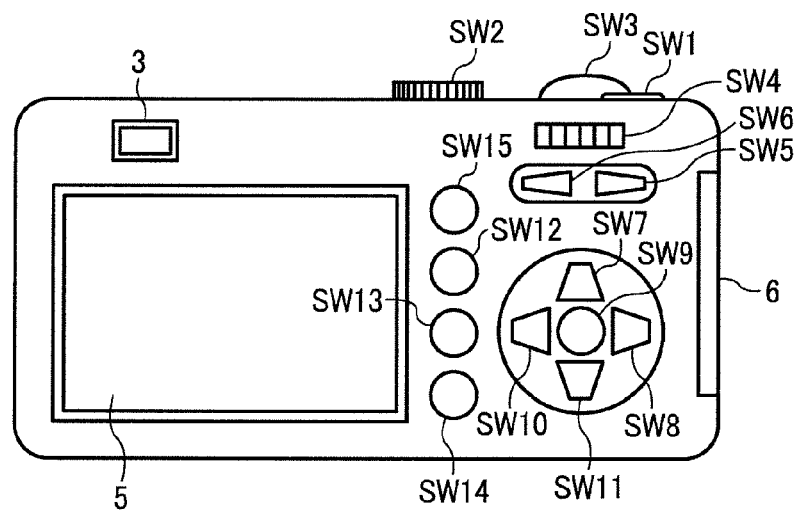
FIG. 2B is a back view of the digital camera.
Figure 2C:
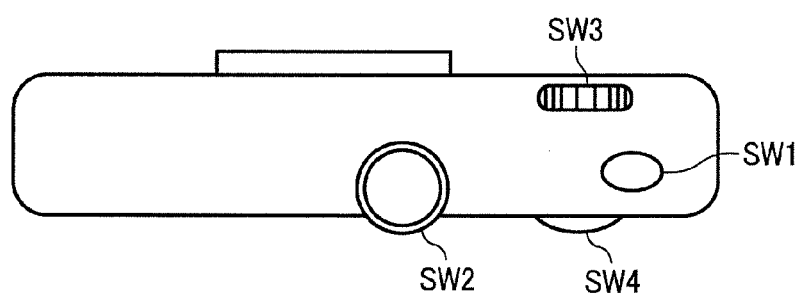
FIG. 2C is a top view of the digital camera.

Referring to FIGS. 2A, 2B, and 2C, each functional component which is installed with the digital camera as the above-described imaging apparatus will be explained.

In FIGS. 2A and 2C, the lens barrel unit 4 is installed in the vicinity of the center of a front surface of a main body of the digital camera, and a flash emitting section 1, a distance measuring unit 2, and an optical viewfinder 3 are installed in an upper part of the front surface. On a top surface of the main body of the digital camera, a shutter release button SW1, a mode dial SW2, and a first jog dial SW3 are installed.

As illustrated in FIG. 2B, on a back surface of the main body of the digital camera, the LCD 5, a second jog dial SW4, a zoom switch (telephoto) SW5, a zoom switch (wide-angle) SW6, an up-direction indicator switch SW7, a right-direction indicator switch SW8, an OK switch SW9, a left-direction indicator switch SW10, a down-direction indicator switch SW11 which also serves as a macro switch, a display switch SW12, a delete switch SW13, a menu switch SW14, and a power switch SW15 are installed. An eye piece of the optical viewfinder 3 is disposed on the back surface of the main body of the digital camera. In the present specification, there are some cases where the above-described various switches SW1 to SW15 are collectively called the operation key unit.

Figure 3:
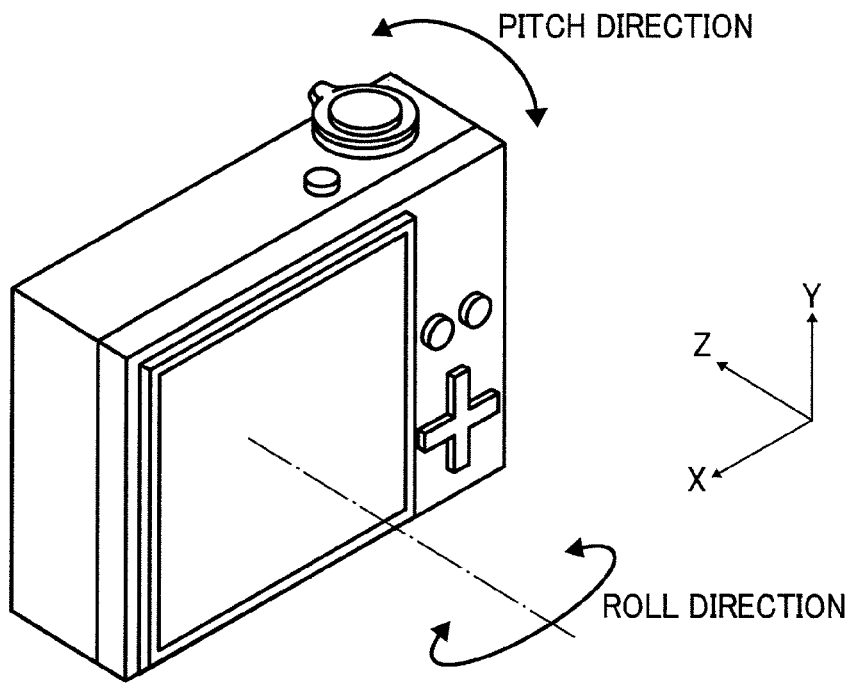
FIG. 3 is an explanatory diagram of a pitch direction and a roll direction of the digital camera as the embodiment of the present invention.
Figure 4:
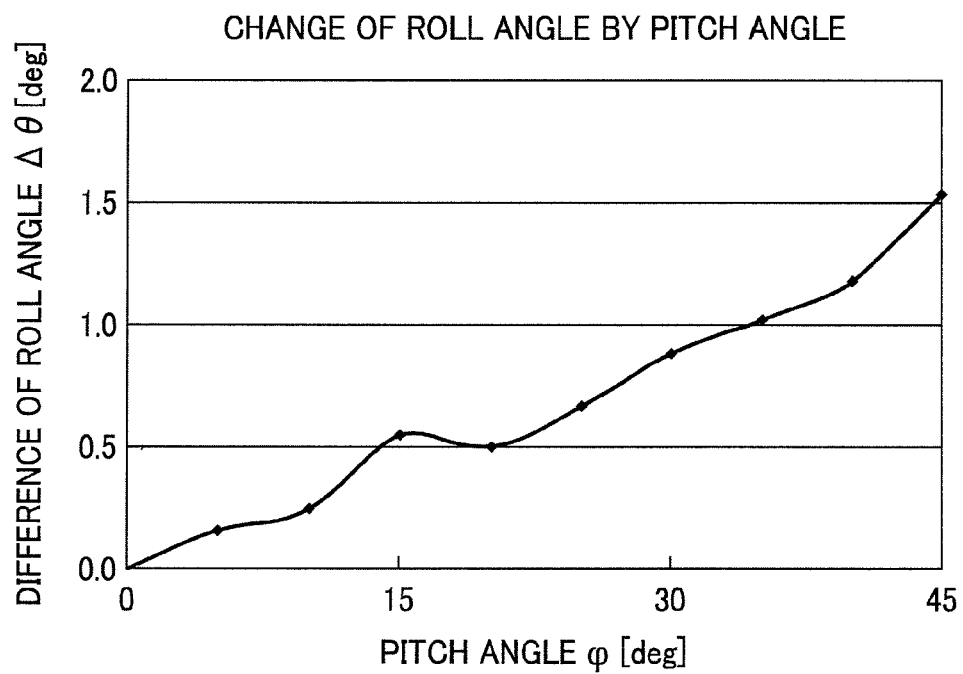
FIG. 4 is a graph of actual measurement values of a change of a roll angle when a pitch angle increases.

Next, a pitch angle and a roll angle of the imaging apparatus (digital camera) will be explained by use of FIG. 3. As illustrated in FIG. 3, an angle in a roll direction (a roll angle) is an angle of rotation about an optical axis of the imaging apparatus (here, the optical axis is taken as a Z axis.), and an angle in a pitch direction (a pitch angle) is an angle of rotation about a horizontal axis of the imaging apparatus (here, the horizontal axis is taken as an X axis). Due to a cross-axis sensitivity and so on, as a pitch angle increases, a roll angle changes. Changes of a roll angle along with changes of a pitch angle are actually measured, and actual measured values are illustrated as a graph in FIG. 4. In FIG. 4, a state where a pitch angle $\phi=0°$ (0 degrees) and a roll angle $\theta=0°$ (0 degrees) is taken as a reference. As illustrated in FIG. 4, it is apparent that as a pitch angle $\phi$ increases, a roll angle $\theta_A$ gradually changes, and a difference of roll angle $\Delta\theta$ increases. In order to solve this problems two examples will be described.

Example 1

Example of Setting Reference Roll Angle Per Range of Pitch Angle $\phi$

Figure 5:
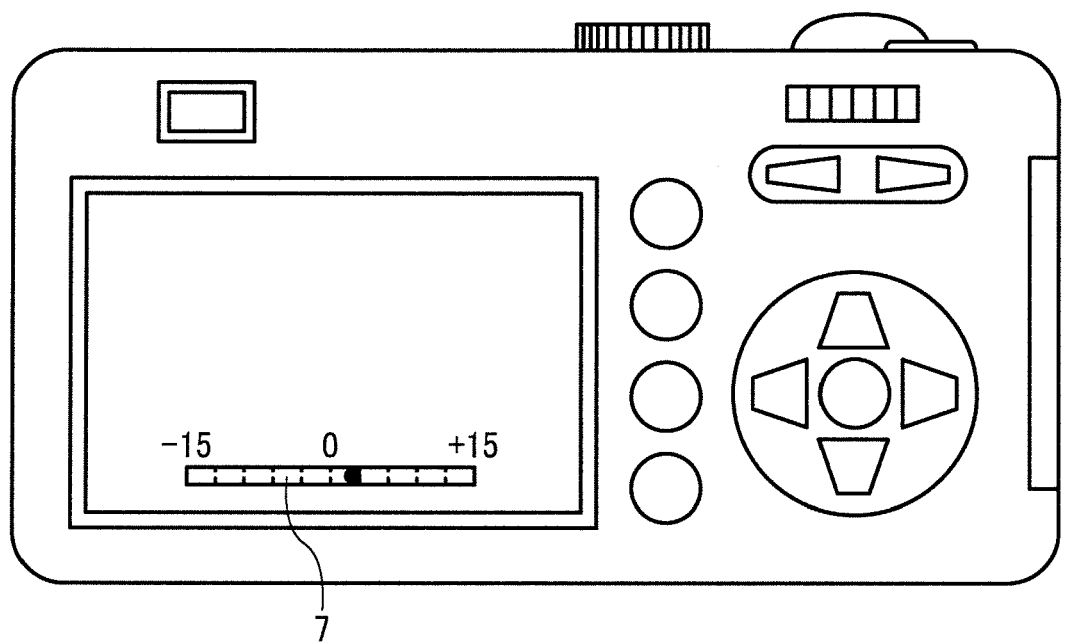
FIG. 5 is a diagram illustrating an example of a display of a digital camera equipped with an electronic level 7.

In a case where the imaging apparatus (digital camera) is equipped with an electronic level 7 (information device) as illustrated in FIG. 5, by use of output values (X, Y, and Z) obtained from the acceleration sensor, an angle calculation is performed by the CPU block 104-3 of the DSP 104 via the I2C block 104-11, and a roll angle $\theta_A$ is calculated (Formula 1). A roll angle $\theta_A$ in a state where a pitch angle $\phi=0°$ and a roll angle $\theta=0°$ is taken as a reference, and output values of the acceleration sensor are stored in the ROM 113. This is performed on each individual imaging apparatus (digital camera) in a process before shipment. The stored values here are taken as a reference roll angle $\theta\_offset0$ . . . (I).

In a conventional method of a calculation of an angle, a roll angle $\theta_A$ is calculated from Formula 1 by use of output values of the acceleration sensor, and then a roll angle to be corrected $\theta$ (correction roll angle $\theta$) is obtained by subtracting the roll angle $\theta\_offset0$ from the calculated roll angle $\theta_A$ (correction roll angle $\theta=\theta_A-\theta\_offset0$).

Additionally, in the embodiment, output values of the acceleration sensor in a case where a pitch angle $\phi$ which is increased and a roll angle $\theta=0°$ are also stored in the ROM 113.

In a case where a correction table is created and an angle correction is performed, output values of the acceleration sensor in four cases, which are a case of a pitch angle $\phi=15°$ and a roll angle $\theta=0°$, a case of a pitch angle $\phi=30°$ and a roll angle $\theta=0°$, a case of a pitch angle $\phi=45°$ and a roll angle $\theta=0°$, and a case of a pitch angle $\phi=60°$ and a roll angle $\theta=0°$, are stored in the ROM 113. These are taken as reference roll angles $\theta\_offset15$ . . . (II), $\theta\_offset30$ . . . (III), $\theta\_offset45$ . . . (IV), and $\theta\_offset60$ . . . (V), respectively.

In Table (correction table) 1 below, each of the reference roll angles (I) to (V) is set per range of pitch angle $\phi$ of the digital camera. And a correction roll angle $\theta$ is calculated by use of each of the reference roll angles (I) to (V) stored in the ROM 113.

TABLE 1

| $0° \le \phi < 15°$ | $15° \le \phi < 30°$ | $30° \le \phi < 45°$ | $45° \le \phi < 60°$ | $60° \le \phi$ |
|---|---|---|---|---|
| (I) | (II) | (III) | (IV) | (V) |

The correction roll angle $\theta$ is calculated by subtracting a reference roll angle which is automatically selected based on a pitch angle $\phi$ (any one of the reference roll angles $\theta\_offset0$, $\theta\_offset15$, $\theta\_offset30$, $\theta\_offset45$, and $\theta\_offset60$) from a roll angle $\theta_A$ which is calculated from Formula 1. For example, a correction roll angle $\theta$ in the case of a pitch angel $\phi=20°$ is obtained by subtracting the reference roll angle $\theta\_offset15$ in the case of the pitch angle $\phi=15°$ from a roll angle $\theta_A$ which is calculated from Formula 1 by use of output values of the acceleration sensor (see Table 1).

Example 2

Example of Calculating Reference Roll Angle from Two Pitch Angles

Accuracy improves by use of the method described in Example 1, however tasks increase. In the present example, assuming that a relationship expressed in FIG. 4 is an approximately linear shape (that is, a proportional relationship), and reference roll angles $\theta\_offset0$ and $\theta\_offset45$ are calculated from pitch angles $\phi=0°$ and $45°$, and then a formula calculating a correction roll angle $\theta$ expressed by a linear shape is derived from these reference angles $\theta\_offset0$ and $\theta\_offset45$.

The correction roll angle $\theta$ is calculated by use of a roll angle $\theta_A$ which is calculated by use of output values of the acceleration sensor and the above calculated reference roll angles $\theta\_offset0$ and $\theta\_offset45$ (see Formula 2).

$$\theta=\theta_A-((\theta\_offset45-\theta\_offset0)/45)*\phi \quad [\text{Formula 2}]$$

By calculating the correction roll angle $\theta$ by use of Formula 2, it is possible to improve accuracy of a roll angle $\theta$ in a case where a pitch angle $\phi$ is not $0°$. In a method of an angle correction of the present example, it is possible to calculate a correction roll angle by a correction formula expressed by a linear shape as described above derived by use of pitch angles obtained from an acceleration sensor as an angle detector, and then correct a roll angle by use of the correction roll angle.

In the above two examples, a case where values of pitch angles $\phi$ are positive has been explained, however the same is true of a case where values of pitch angles $\phi$ are negative.

That is, the values of the pitch angles $\phi$ in a correction table where the values of the pitch angles $\phi$ are negative and the values of the pitch angles $\phi$ in Table 1 where the values of the pitch angle $\phi$ are positive are symmetrical to the pitch angle of $0°$. And by use of the correction table, a reference roll angle is automatically selected based on a pitch angle $\phi$, and then a roll angle $\theta$ is corrected by use of the reference roll angle.

As for the information device of the embodiment, an example that an information device is mounted on an imaging apparatus such as a camera and used has been explained, however the information device also can be mounted on mobile devices (game machine, PDA (personal digital assistance), mobile communication device, in-car image input device, and monitoring device) and the like and used.

According to the embodiment, it is possible to display a highly-accurate roll angle of an object, for example, an imaging apparatus such as a digital camera.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging apparatus, comprising:
   an image sensor which photoelectrically converts an optical image;
   an imaging processor which obtains image data via the image sensor;
   an angle detector which outputs data to obtain a roll angle of the imaging apparatus as an object and a pitch angle of the imaging apparatus as an object;
   a calculator which calculates the roll angle of the imaging apparatus and the pitch angle of the imaging apparatus; and
   a corrector which corrects the calculated roll angle of the imaging apparatus based on (1) the calculated pitch angle of the imaging apparatus and (2) measurements made on the imaging apparatus while the angle detector is located within the imaging apparatus, and
   wherein the imaging apparatus is a digital camera, and wherein the digital camera includes a front surface, a back surface, a lens barrel unit in the vicinity of the front surface, a display on the back surface, and switches for operating components of the imaging processor, and
   wherein the angle detector is a 2-axis acceleration sensor or a 3-axis acceleration sensor, and wherein the 2-axis acceleration sensor or the 3-axis acceleration sensor is located within the digital camera.

2. The imaging apparatus according to claim 1, comprising: a correction table based on measurements made on the digital camera while the 2-axis acceleration sensor or the 3-axis acceleration sensor is located within the digital camera, in which a reference roll angle used for a correction of the roll angle is set per range of a pitch angle, wherein the corrector automatically selects the reference roll angle based on the pitch angle by use of the correction table.

3. The imaging apparatus according to claim 2, wherein values in the correction table are symmetrical to a pitch angle of 0°.

4. The imaging apparatus according to claim 2, wherein the corrector calculates a correction roll angle by a correction formula expressed by a linear shape which is derived by pitch angles obtained from the data outputted by the angle detector, and corrects the roll angle by use of the calculated correction roll angle.

5. An imaging apparatus, comprising:
   an image sensor which photoelectrically converts an optical image;
   an imaging processor which obtains image data via the image sensor;
   an angle detector which outputs data to obtain a roll angle of the imaging apparatus as an object and a pitch angle of the imaging apparatus as an object;
   a calculator which calculates the roll angle of the imaging apparatus and the pitch angle of the imaging apparatus; and
   a corrector which corrects the calculated roll angle of the imaging apparatus based on (1) the calculated pitch angle of the imaging apparatus and (2) measurements made on the imaging apparatus while the angle detector is located within the imaging apparatus, and
   wherein the imaging apparatus is a digital camera, and wherein the digital camera includes a front surface, a back surface, a lens barrel unit in the vicinity of the front surface, a display on the back surface, and switches for operating components of the imaging processor, and
   wherein the display is capable of displaying a corrected roll angle of the digital camera, and wherein the angle detector is located within the digital camera.

6. A method of an angle correction of an object, comprising:
   a step of providing a digital camera;
   a step of imaging which photoelectrically converts an optical image;
   a step of imaging processing which obtains image data via the step of imaging;
   a step of an angle detection which outputs data to obtain a roll angle of the digital camera as the object and a pitch angle of the digital camera as the object;
   a step of calculating which calculates the roll angle of the digital camera and the pitch angle of the digital camera; and
   a step of a correction which corrects the calculated roll angle of the digital camera based on (1) the calculated pitch angle of the digital camera and (2) measurements made on the digital camera while an angle detector is located within the imaging apparatus, and
   wherein the imaging step and the imaging processing step are performed by the digital camera, and wherein the digital camera includes a front surface, a back surface, a lens barrel unit in the vicinity of the front surface, a display on the back surface, and switches for controlling components of the imaging processing step, and
   wherein the method of angle correction further comprises a step of displaying a corrected roll angle of the digital camera in the display of the digital camera, and wherein the angle detection step is performed by the angle detector while the angle detector is located within the digital camera.

7. The method of the angle correction according to claim 6, wherein in the step of the correction, a correction table based on measurements made on the digital camera while the angle detector is located within the digital camera, in which a reference roll angle used for a correction of the roll angle is set per range of a pitch angle is used, and a reference roll angle is selected based on the pitch angle.

8. The method of the angle correction according to claim 7, wherein values in the correction table are symmetrical to a pitch angle of 0°.

9. The method of the angle correction according to claim 6, wherein the step of the correction calculates a correction roll angle by a correction formula expressed by a linear shape which is derived by pitch angles obtained from the data outputted in the step of the angle detection, and corrects the roll angle by use of the calculated correction roll angle.

10. The method of the angle correction according to claim 6, wherein in the step of the angle detection, a 2-axis acceleration sensor or a 3-axis acceleration sensor is used.

* * * * *